UNITED STATES PATENT OFFICE.

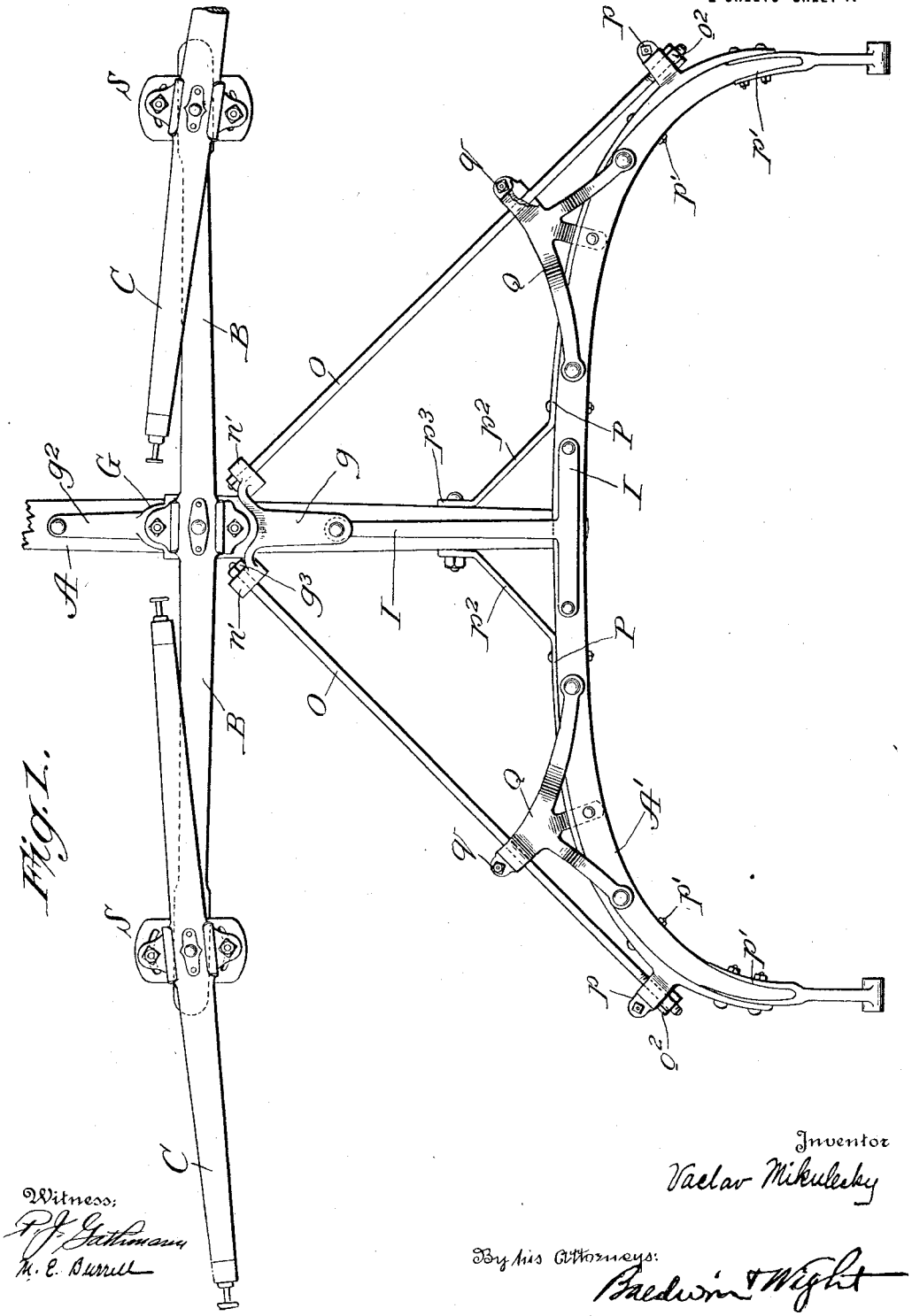

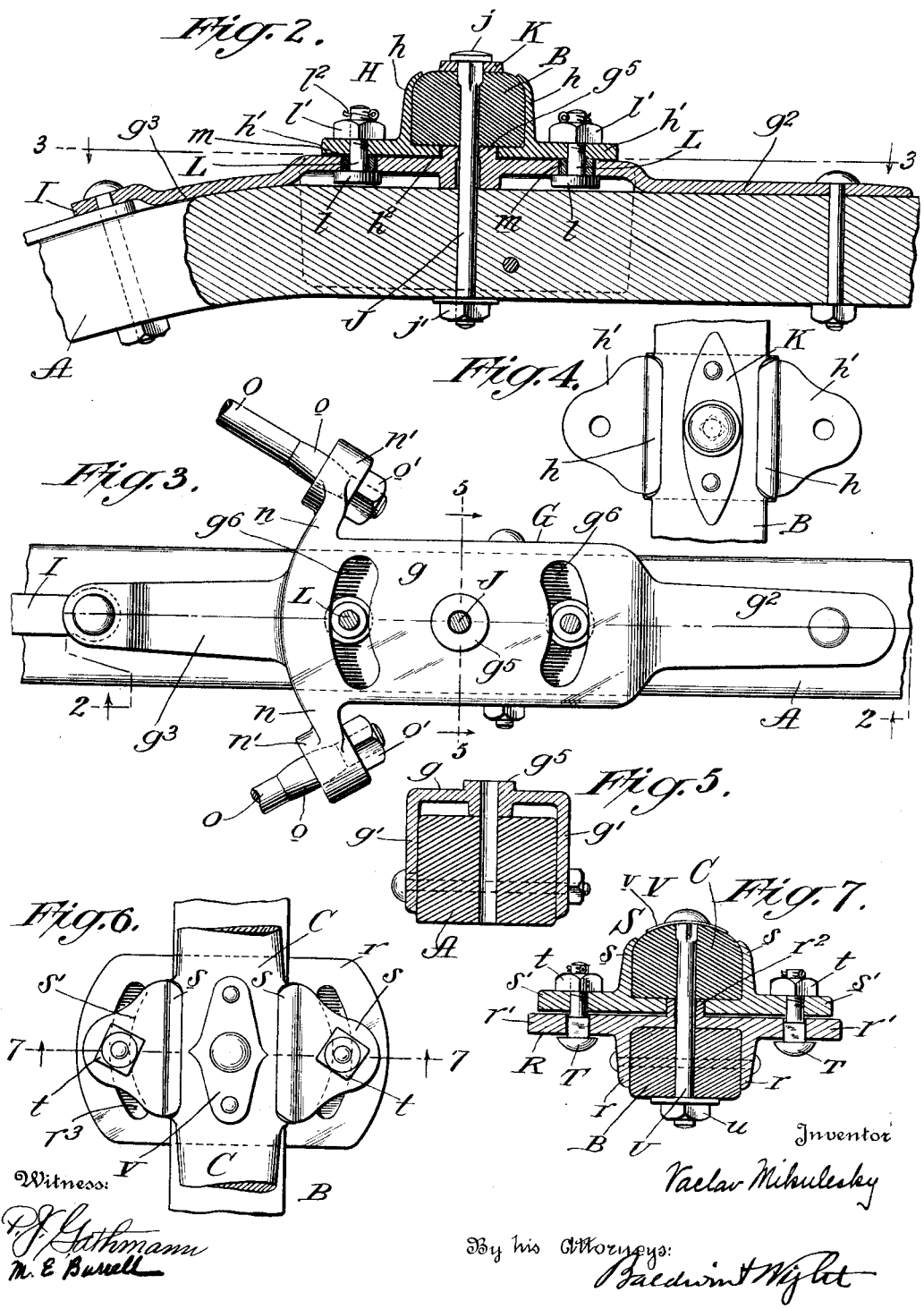

VACLAV MIKULECKY, OF VERDIGRE, NEBRASKA.

DRAFT APPLIANCE FOR VEHICLES.

1,181,786.  Specification of Letters Patent.  Patented May 2, 1916.

Application filed December 30, 1915.  Serial No. 69,361.

*To all whom it may concern:*

Be it known that I, VACLAV MIKULECKY, a citizen of the United States, residing in Verdigre, in the county of Knox and State of Nebraska, have invented certain new and useful Improvements in Draft Appliances for Vehicles, of which the following is a specification.

The object of this invention is to provide improved draft appliances for vehicles which are strong and durable, capable of ready adjustment, and which afford easy movement of the moving parts within proper limits.

According to this invention the tongue or pole of the vehicle is provided at its rear end with a curved cross bar or circle, and it carries forward of the cross bar a double-tree coupling of novel construction which is connected with the cross bar or circle by diagonally arranged adjustable brace rods which are supported intermediate their front and rear ends by brackets extending from the circle.

In the accompanying drawings, Figure 1 is a plan view of draft appliances constructed in accordance with my invention. The remaining figures are on enlarged scale. Fig. 2 shows a section on the line 2—2 of Fig. 3, and illustrates the double-tree coupling and its connection with the pole. Fig. 3 is a plan view of a portion of the pole and the lower member of the double-tree coupling and shows the pivot bolt in section on the line 3—3 of Fig. 2. Fig. 4 is a plan view of a portion of the double-tree and of the upper member of the double-tree coupling. Fig. 5 shows a transverse section on the line 5—5 of Fig. 3. Fig. 6 is a plan view of the swingle-tree coupling and a portion of one of the swingle-trees. Fig. 7 shows a transverse section on the line 7—7 of Fig. 8.

The pole or tongue A is provided at its rear end with a cross-piece or circle A', as usual, and it carries a double-tree B and swingle-trees C. The double-tree center comprises a member G which is secured to the pole and a member H secured to the double-tree. The member G is formed with a middle portion $g$ having downwardly extending flanges $g'$ which are bolted to the sides of the pole, a forwardly extending arm $g^2$ bolted to the top of the pole and a rearwardly extending arm $g^3$ bolted to the rear portion of the pole and also connected to a T-plate I secured to the cross-piece or circle A'. The upper or outer member of the coupling comprises side flanges $h$, and base-pieces $h'$ which are forward and rearward of a central opening $h^2$ which receives a boss $g^5$ formed on the lower member of the coupling. The double-tree is mounted between the flanges $h$, and a bolt J pivotally connects the two members of the coupling. This bolt is headed at $j$ and carries a nut $j'$. A cap plate K is interposed between the head of the bolt and the double-tree, and as shown, the headed end of the bolt is square to prevent it from turning. This affords a pivotal connection between the double-tree and the tongue, but in order to properly limit the swinging movement of the double-tree I form curved slots $g^6$ in the member G through which extend bolts L that also extend through the base members $h'$ of the coupling member H. The bolts L carry anti-friction rollers $m$ which operate in the slots $g^6$ and the bolts carry on their upper ends nuts $l'$ and cotter pins $l^2$. By this construction the double-tree is permitted to move freely to a limited extent and the use of straps or other such contrivances for limiting the movement of the double-tree is avoided. Similar couplings are employed for connecting the swingle-trees with the double-tree. One of these couplings is shown in detail in Figs. 7 and 8. It comprises a lower member R, formed with flanges $r$ to receive the double-tree B and with laterally projecting flanges $r'$ which are formed with curved slots $r^3$ for the bolts T. The double-tree is bolted to the flanges $r$, as indicated in Fig. 7. The upper member S of the coupling is formed with flanges $s$ which are bolted to the swingle-tree and which has laterally projecting flanges $s'$ through which the bolts T extend. The headed ends of the bolts T are squared as shown to prevent them from turning but permitting them to move in the slots $r^3$ and these bolts carry nuts $t$ on their outer ends. The base of the member S is formed with a central opening into which extends a boss $r^2$, formed on the lower member R.

A bolt U extends through the double-tree, the swingle-tree and the coupling members and this bolt carries a nut $u$ which may, if necessary, be locked in any suitable way. A cap plate $v$ is preferably interposed between the head V of the bolt and the swingle-tree, and the arrangement is such that the swingle-tree, while free to swing to a limited extent, is prevented from too great a range of movement and is held against undue movement in a vertical plane.

The lower member G of the double-tree coupling is formed with laterally projecting arms $n$ having on their outer ends circular lugs $n'$ which are provided with openings, as shown, to receive the forward ends of the brace rods O. As will be observed, these rods have enlarged ends $o$ which are tapered and enter tapered openings in the lugs $n'$. The rods are threaded at their forward ends and receive the nuts $o'$. The rods O extend diagonally rearward and outward and are connected at their rear ends to clamps $p$ projecting outward from strap irons P attached at $p'$ to the circle A'. These strap irons at their inner ends next the tongue are bent to form braces $p^2$ connected at $p^3$ with the tongue, thus serving to brace the tongue near its connection with the circle. The rear ends of the rods O are threaded and carry nuts $o^2$ by means of which the connection between the double-tree coupling and the tongue circle may be tightened.

Q indicates brackets attached to the circle A' and having portions projecting outward and forward therefrom provided with clamps $q$ which engage the rods O and serve to prevent such rods from bending or buckling. By this organization a connection is made between the outer portions of the circle and the double-tree coupling which is such that the tongue is securely braced. Bending or buckling of the brace rods is prevented by the brackets Q as above explained, and a proper and suitable relation between the tongue and the circle is obtained by the use of these adjustments. It will be observed that the front ends of the brace rods are firmly held in the lugs $n'$ of the coupling G. By adjusting the nuts $o^2$ and the clamps $p$ and $q$ the proper relation of the brace rods, the circle and the tongue may be produced.

I claim as my invention:

1. Draft appliances for vehicles, comprising a tongue or pole, a pole circle to which the rear end of the pole is secured, strap irons attached to the circle and formed with braces connected to the rear portion of the pole, a double-tree coupling attached to the pole, diagonally arranged brace rods attached to said coupling and adjustably connected with said strap irons, and braces attached to the pole circle and clamped to the brace rods intermediate their front and rear ends.

2. The combination with a vehicle pole, of a pole circle to which the rear end of the pole is secured, a double-tree coupling comprising a member having front and rear arms attached to the pole, laterally projecting lugs on opposite sides, and a middle portion formed with curved slots, another coupling member formed with flanges attached to the double-tree and carrying bolts extending through the slots of the first mentioned member of the coupling, a pivot bolt extending through the coupling, the double-tree and the pole, and diagonally arranged brace rods attached to the lugs of said coupling and to said pole circle.

In testimony whereof, I have hereunto subscribed my name.

VACLAV MIKULECKY.

Witnesses:
VACLAV ONDRACEK,
JOHN HOUZVICKO.

Copies of this patent may be obtained for five cents each, by addressing the "Commissioner of Patents, Washington, D. C."